Feb. 13, 1940.   C. M. JONES   2,190,564
OPTICAL INSTRUMENT
Filed Aug. 31, 1938   4 Sheets-Sheet 1
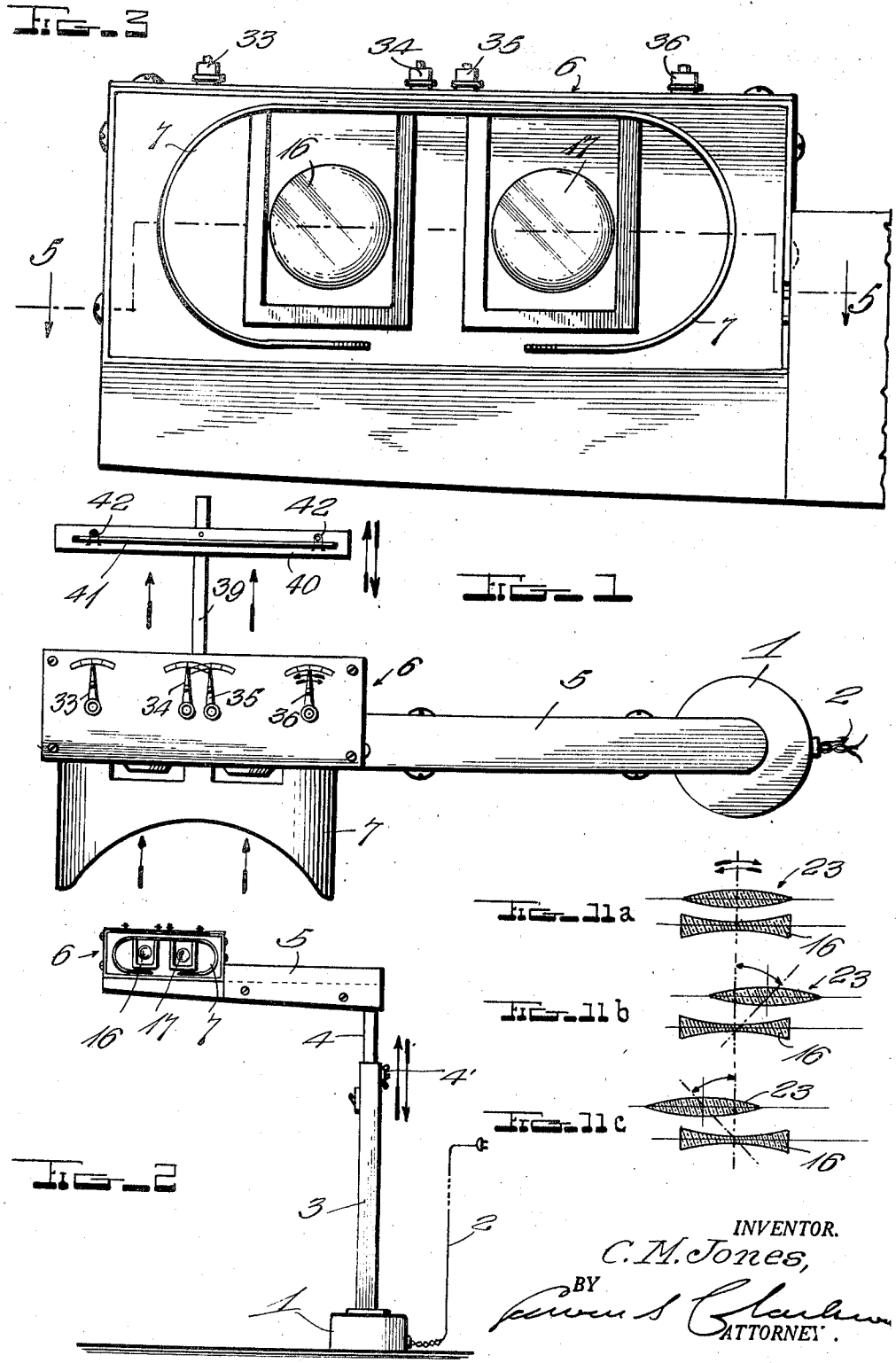
INVENTOR.
C. M. Jones,
BY
ATTORNEY.

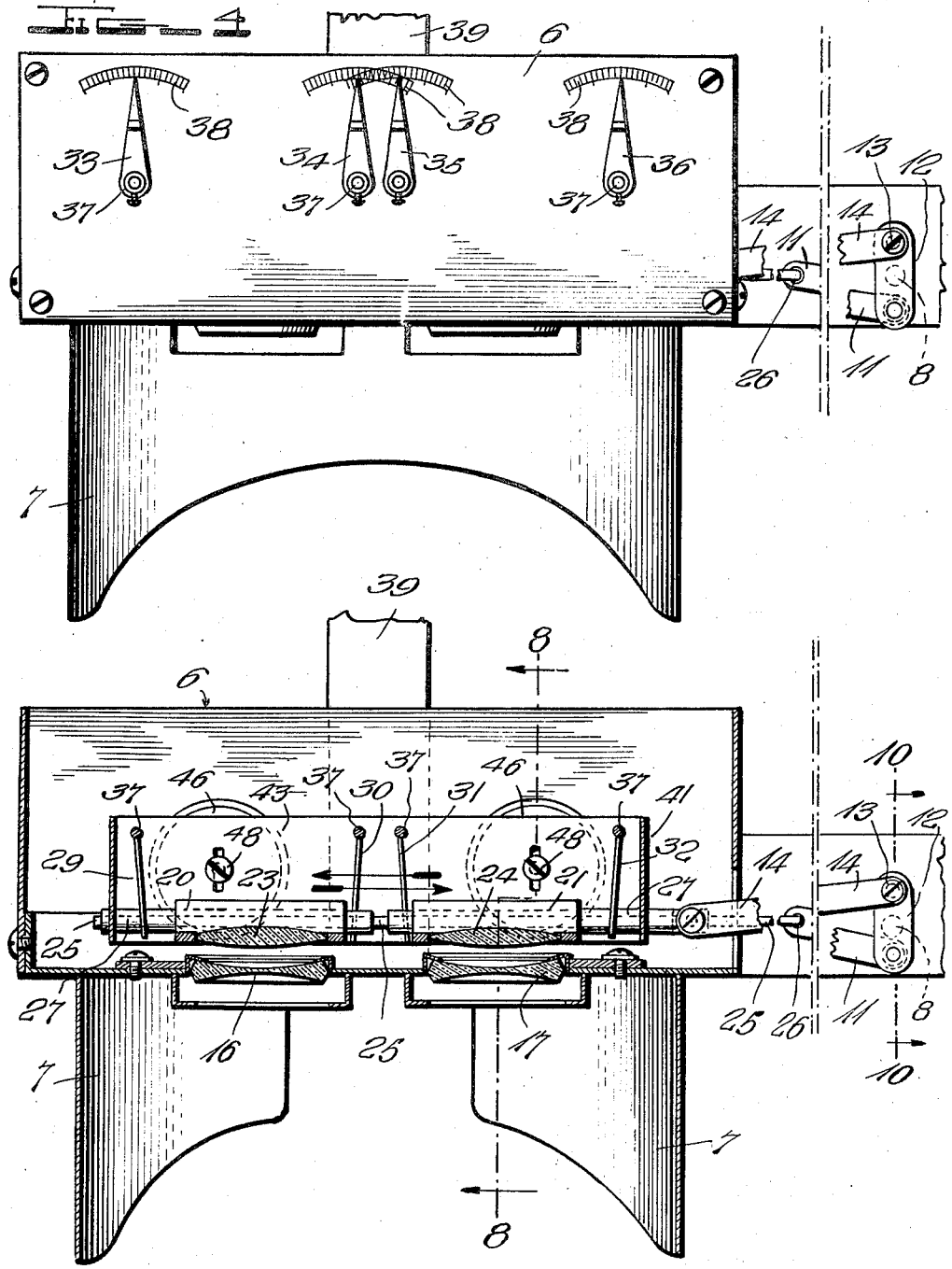

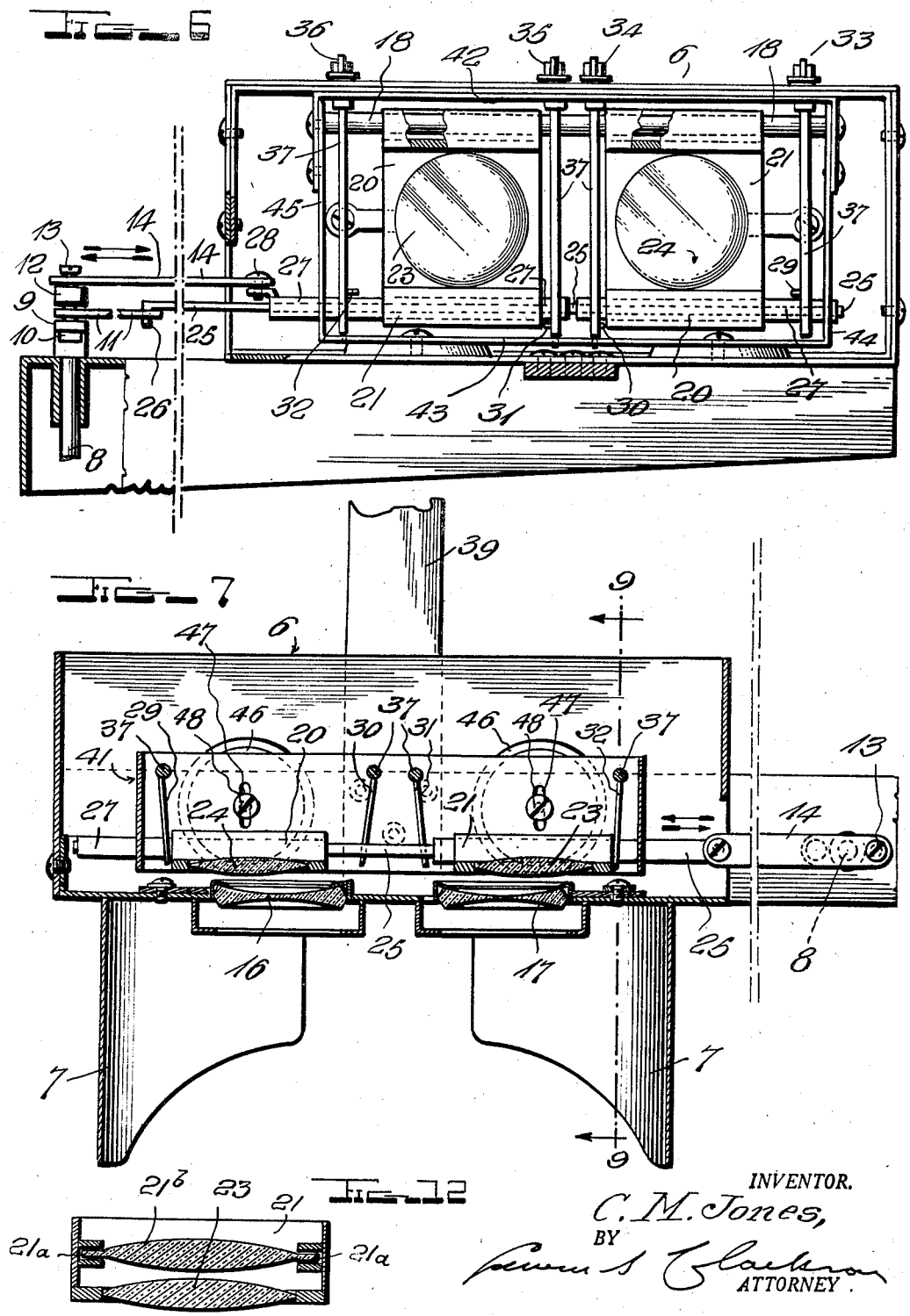

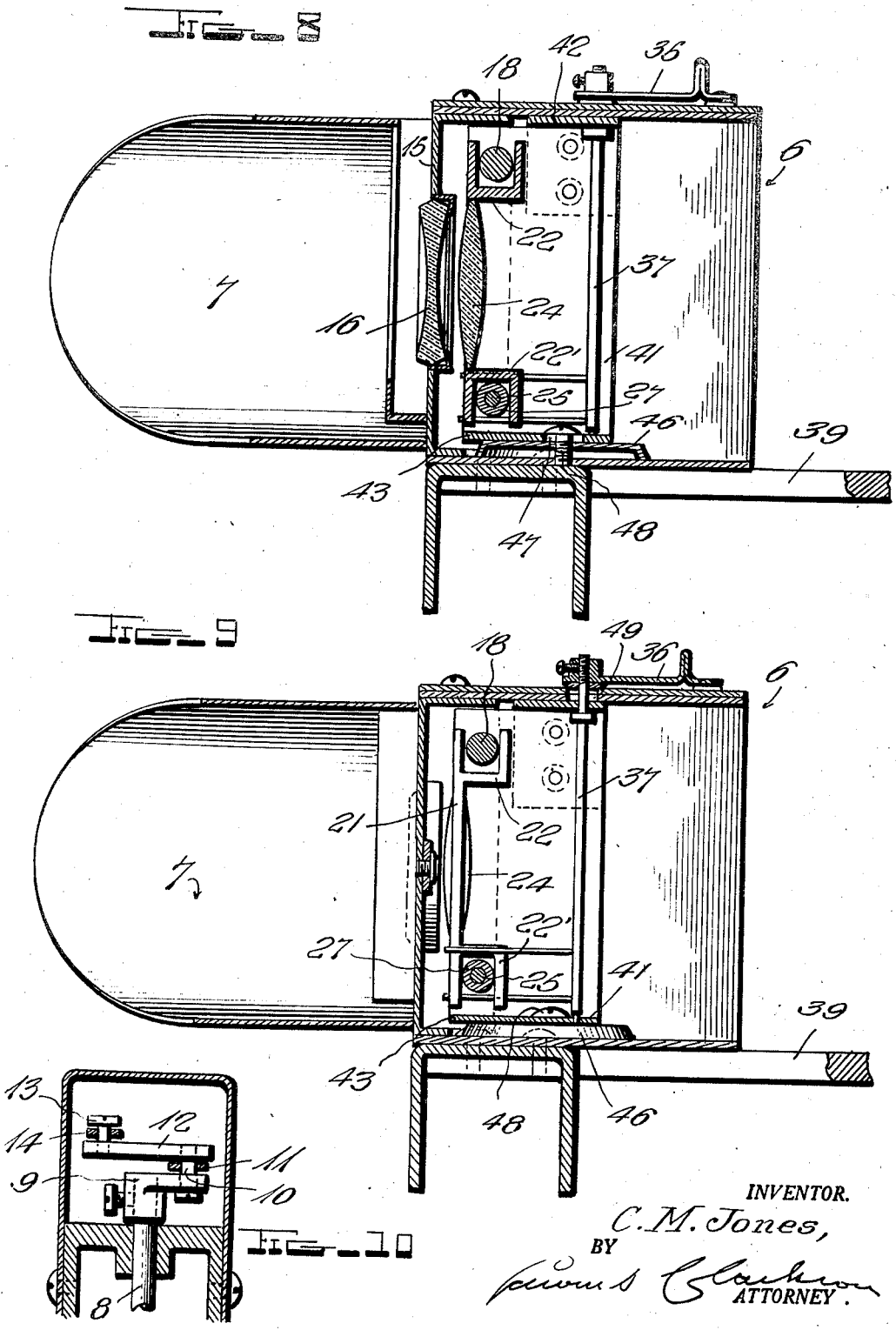

Patented Feb. 13, 1940

2,190,564

UNITED STATES PATENT OFFICE 2,190,564

OPTICAL INSTRUMENT

Charles Myron Jones, Yakima, Wash.

Application August 31, 1938, Serial No. 227,844

3 Claims. (Cl. 128—76.5)

The object of my invention is to provide an optical instrument designed not only to strengthen and develop the muscles of the eyes, but to stimulate freedom, motility and co-ordination of all the functions of the eyes, nerve impulses, et cetera, as actually used in the daily work of the eyes.

The instrument may be used with stereoptic pictures or with any moving or stationary target desired. While the eyes are held at a fixed focus on the target used, the convergence and divergence of the eyes is slowly shifted between predetermined limits at which the stops are set. In this way the habits of association of the two nerve impulses and the co-ordination or lack of it can be corrected according to the need found.

In the drawings:

Figure 1 is a top plan view of an instrument embodying my invention.

Figure 2 is a side elevation of Figure 1.

Figure 3 is a detail front elevation of the lens box on an enlarged scale.

Figure 4 is a top plan view of Figure 3.

Figure 5 is a horizontal section on the line 5—5 of Figure 3.

Figure 6 is a rear elevation of the instrument, partly in section.

Figure 7 is a view similar to Figure 5 showing the lenses out of alignment.

Figure 8 is a transverse vertical section on the line 8—8 of Figure 5.

Figure 9 is a view similar to Figure 8 on the line 9—9 of Figure 7.

Figure 10 is a detail sectional view on the line 10—10 of Figure 5.

Figures 11a, 11b and 11c are schematic illustrations of the normal and extreme positions of the lenses assumed during the operation of the device.

Figure 12 is a longitudinal sectional view of the lens holder with lens for stereoscope work.

The reference numeral 1 designates a base in which is a suitable electric motor connected to the cord 2 which may be connected to an electrical outlet. A standard 3 is secured to the base and is provided with a telescoping section 4 held in adjusted position by the wing nut 4' whereby the height of the instrument may be adjusted to suit the patient.

A housing 5 is connected to the upper end of the section 4 and extends at right angles thereto. At the free end of the housing a lens box 6 is secured, which box is provided with the hood 7, the top front edge of which is concaved to conform to the head of the patient.

A shaft 8 is secured to the motor and extends upwardly through the standard 3—4 to the upper end of which is keyed a motion transmitting arm 9 (see Fig. 10) extending beyond one side of the shaft and having a pin 10 at its free end to which one end of a link 11 is pivotally connected. A second motion transmitting arm 12 is connected at one end to the pin 10 (see Figure 10), said second arm extending at its free end beyond the diametrically opposite side of the shaft and having a pin 13 to which is pivoted one end of a link 14.

The front wall 15 of the lens box is provided with concave lenses 16, 17, rigidly secured in proper position and appropriately spaced.

A rod 18 is secured within and at the top of the lens box 6. Lens holders 20—21 are provided with channel or groove like elements 22, 22' at the top and bottom thereof. The rod 18 in the element 22 acts merely as a guide for the top of the lens frames. Convex lens 23, 24, are mounted in these lens holders 20—21.

The lens holder 20 is frictionally mounted at its bottom on the rod 27 and is moved thereby solely by friction. A rod 27 frictionally telescoped within the rod 25 is connected to the link 11 which in turn is connected to the arm 12. The lens holder 21 is frictionally mounted on the rod 27' through which the rod 25 also telescopes with a frictional engagement, said rod 27' being connected as indicated at 28 by link 14 to the arm 9. Thus the lens holders are adapted to be reciprocated simultaneously and alternately toward and from each other and each first in one direction and then in the opposite direction across the coacting lens 16 or 17.

Inside of the lens box I provide a lens frame 41 having a top wall 42, a bottom wall 43, and side walls 44, 45, the lower wall resting on the projection 46; the lower wall having an elongated slot 47 through which a set screw 48 passes, while the top wall of the lens box 6 is provided with an elongated slot 49 through which the top portion of the rods 37 pass, whereby the lens frame 41 may be adjusted toward and from the front wall of the lens box to space the convex lenses 24 toward or from the concave lenses 16 as may be required.

A rod 39 extends rearwardly from the lens box and is provided at its rear end with a holder 40 upon which the object 41 to be observed is secured by suitable clamps 42. This card holder 40 may be slid along the rod 39 and is used for stereoscopic cards only.

The strength of the lenses is approximately the same, and by sliding the lenses so that the optical centers are not in line with each other, a prismatic effect is secured according to the distance moved. As explained, the concave lens is mounted rigidly while the convex lens is slidably mounted. Starting with the transmission of motion through motor, shaft, links and rods, a reciprocating motion to the lenses first away from each other and then towards each other is transmitted to the slidable lens holders. The sidewise movement of the slidable lens holders is controlled by the stops 29, 31, 30, 32, stops 29 and 32 which limit the outward sidewise movement of these lens holders relative to each other and stops 30 and 31 limit the inward movement of the lens holders relative to each other and overcome the frictional engagement between the holders and the rods 23 and 27. In other words, while the rods 25 and 27 always have fixed ranges of motion in the rotation of arms 9 and 12 the movements of the lens holders may be controlled, because of their sliding engagement with the rods, by means of the aforesaid stops. These stops are adjustable to regulate the extent of motion of the lens holders by the indicator levers 33, 34, 35, 36, which are connected by rods 37 to the stops 29—32. Associated with these indicators are notched graduated scales 38 the notches in which are adapted to receive the file or pointer ends of the indicator levers to hold said levers in adjusted position.

To make a stereoscope of the instrument the lens holders 21 are provided with grooves 21a into which lens 21b may be positioned.

What I claim is:

1. In an optical instrument of the character described, two pairs of lenses, the lenses of one pair being arranged in rear of the lenses of the other pair, and the lenses of the rear pair being mounted for reciprocating motion in paths crossing the optical paths of the lenses of the other or front pair, a rotary shaft, arms extending from the rotary shaft in opposite directions, and connections between said arms and the respective lenses of the rear pair for reciprocating said lenses in said paths toward and from each other.

2. In an optical instrument of the character described, a pair of front lenses, a pair of rear lenses each movable back and forth across the optical path of one of the front lenses, a pair of fixed stroke driving elements each having a frictional driving engagement with one of the rear lenses and on which the lens is slidably movable, means for reciprocating said driving elements to communicate corresponding motion to the rear lenses toward and from one another, and adjustable stops for limiting the range of movement of each rear lens to a desired degree less than the full range of movement of its driving element.

3. In an optical instrument of the character described, a pair of front lenses, a pair of rear lenses each movable back and forth across the optical path of one of the front lenses, a pair of fixed stroke driving elements each having a frictional driving engagement with one of the rear lenses and on which the lens is slidably movable, a rotary shaft, arms projecting in diametrically opposite directions from the shaft and connected to the driving elements for moving the same in opposite directions simultaneously, and adjustable stops for limiting the range of movement of each rear lens to a desired degree less than the full range of movement of its driving element.

CHARLES MYRON JONES.